(12) United States Patent
Gallato

(10) Patent No.: US 9,784,323 B2
(45) Date of Patent: Oct. 10, 2017

(54) HYDRAULIC VALVE ASSEMBLY AND CLUTCH ACTUATING DEVICE

(71) Applicants: ZF Friedrichshafen AG, Friedrichshafen (DE); ZF PADOVA S.r.l., Caselle di Selvazzano (IT)

(72) Inventor: Fernando Gallato, Padua (IT)

(73) Assignees: ZF Friedrichshafen AG, Friedrichshafen (DE); ZF Padova S.R.L., Caselle di Delvazzarno (PD) (IT)

(*) Notice: Subject to any disclaimer, the term of this patent is extended or adjusted under 35 U.S.C. 154(b) by 21 days.

(21) Appl. No.: 15/015,166

(22) Filed: Feb. 4, 2016

(65) Prior Publication Data

US 2016/0363178 A1    Dec. 15, 2016

(30) Foreign Application Priority Data

Jun. 12, 2015   (DE) .................. 10 2015 210 742

(51) Int. Cl.

| | |
|---|---|
| *F16D 48/02* | (2006.01) |
| *F16D 13/52* | (2006.01) |
| *F16K 11/07* | (2006.01) |
| *F16K 31/46* | (2006.01) |
| *F16K 11/076* | (2006.01) |

(52) U.S. Cl.
CPC ............ *F16D 25/14* (2013.01); *F16D 13/52* (2013.01); *F16D 48/02* (2013.01); *F16K 11/07* (2013.01); *F16K 11/076* (2013.01); *F16K 31/465* (2013.01); *Y10T 137/86509* (2015.04)

(58) Field of Classification Search
CPC .......... F16D 25/14; F16D 48/02; F16D 13/52; F16K 11/07; F16K 11/076; F16K 31/465; Y10T 137/86509
See application file for complete search history.

(56) References Cited

U.S. PATENT DOCUMENTS

| | | | | |
|---|---|---|---|---|
| 3,391,767 | A * | 7/1968 | Stow ...................... | F15B 11/00 192/113.35 |
| 3,698,525 | A * | 10/1972 | Grassmuck ............ | B60K 23/02 192/85.14 |
| 3,752,281 | A * | 8/1973 | Arnold .................. | F16D 25/123 137/625.24 |
| 3,780,762 | A * | 12/1973 | Matthews .............. | B62D 11/08 137/596 |

(Continued)

FOREIGN PATENT DOCUMENTS

DE            39 00 057 A1    7/1989

*Primary Examiner* — Kevin Barss
(74) *Attorney, Agent, or Firm* — Davis & Bujold, PLLC; Michael J. Bujold

(57) ABSTRACT

A hydraulic valve assembly (1) with a housing (18) and with a spool (2) which is rotatable in the housing (18). The spool comprising a pressure supply orifice (3) and at least one clutch actuating orifice (4, 5) which is connectable to a clutch actuating cylinder (6, 7). The spool (2) comprises a pressure release orifice (8) which is arranged at the spool (2) so that the pressure release orifice (8) is closed by rotational movement of the spool (2) while the clutch actuating orifice (4, 5) is opened by such rotational movement. The invention further relates to a clutch actuating device with such a hydraulic valve assembly (1) and a corresponding marine propulsion system.

7 Claims, 3 Drawing Sheets

(56) References Cited

U.S. PATENT DOCUMENTS

Figure 1:
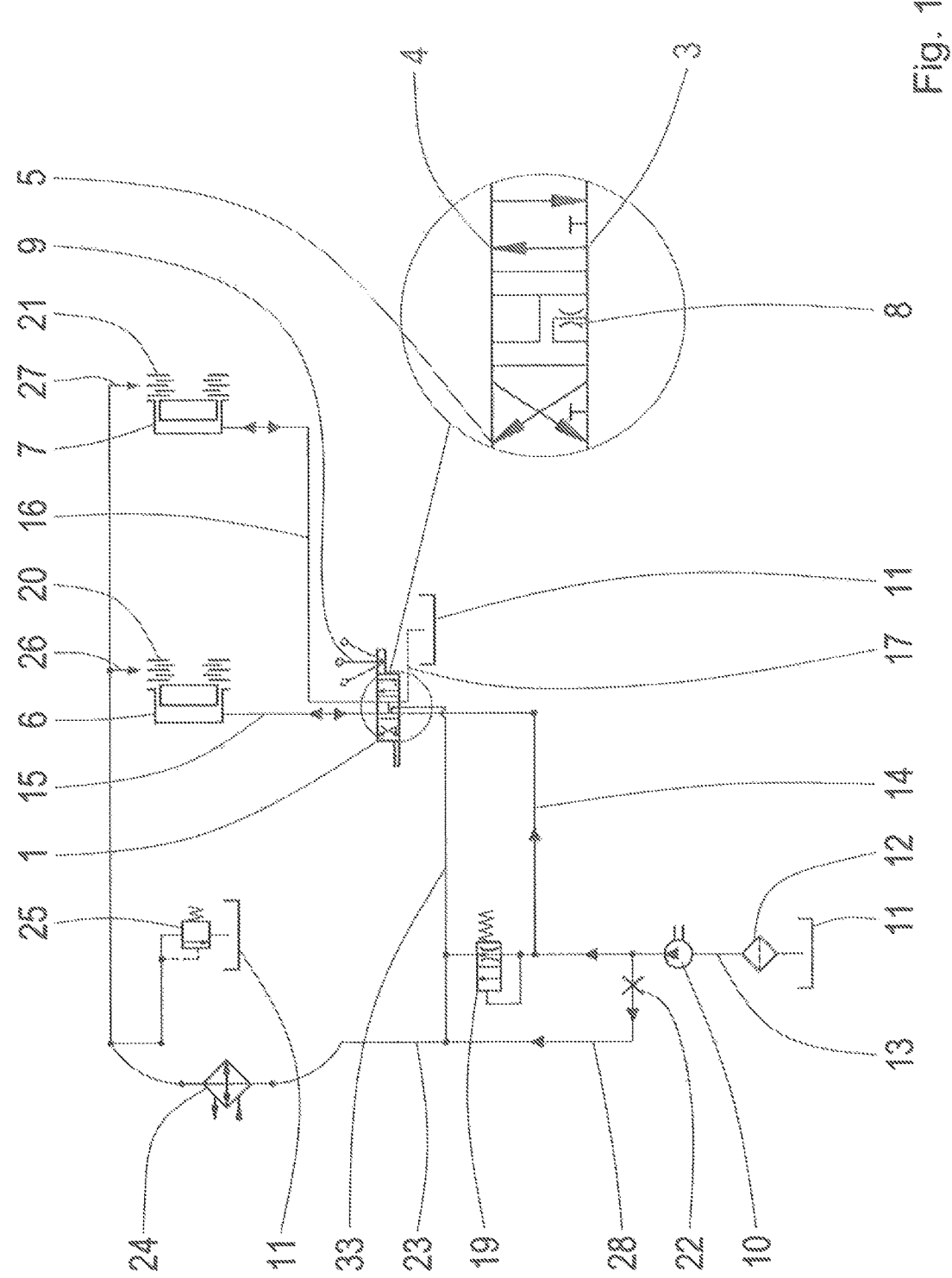

| | | | | |
|---|---|---|---|---|
| 3,823,801 | A | * | 7/1974 | Arnold ................ B63H 23/08 192/109 F |
| 3,938,637 | A | * | 2/1976 | Murakami .......... B63H 21/213 137/625.23 |
| 3,991,787 | A | * | 11/1976 | Schmitt ................ B66D 1/44 137/596.13 |
| 4,281,676 | A | * | 8/1981 | Morris ................ F16D 25/14 137/102 |
| 4,611,621 | A | * | 9/1986 | Miyakawa .......... G05D 16/103 137/115.23 |
| 4,895,182 | A | | 1/1990 | Gerl |
| 8,062,174 | B2 | * | 11/2011 | Sah ...................... B60K 6/445 477/15 |
| 9,205,907 | B2 | * | 12/2015 | Kuriyagawa .......... B63H 20/20 |
| 2009/0247026 | A1 | * | 10/2009 | Suzuki ................ B63H 21/22 440/1 |
| 2011/0143612 | A1 | * | 6/2011 | Kuriyagawa .......... B63H 21/21 440/86 |

* cited by examiner

HYDRAULIC VALVE ASSEMBLY AND CLUTCH ACTUATING DEVICE

The present invention concerns a hydraulic valve assembly and a clutch actuating device, particularly for a marine propulsion system.

Marine propulsion systems usually comprise at least one friction clutch to connect or disconnect the power train of the boat and/or to enable forward and reverse movement of the boat by shifting the rotational direction of a propeller shaft. A common type of such clutches is a multi-plate disk clutch.

The clutches are typically actuated by a hydraulic actuating system which comprises one or more hydraulic valves in order to control the hydraulic pressure on a clutch actuating cylinder. Different types of hydraulic valves are known for this purpose, like manually, hydraulically or electromagnetically controllable valves.

An essential aspect in such marine propulsion systems is the pressure increase for clutch closing in the hydraulic clutch actuating system. Usually a pressure increase is required which ensures a speedy clutch closing, however avoiding a harsh engagement of the clutch. Such harsh engagement happens for example, when a driver respectively a driver starts to move a ski-boat trying to tug a water skier.

There are hydraulic actuating systems with hydraulic valves which can be electronically or hydraulically controlled in closed-loop control and/or in open-loop control systems. With such systems it is possible to modulate the clutch actuating pressure according to a rising pressure ramp in order to obtain a smooth clutch closing. However, such pressure modulation systems require a high level of complexity. Moreover the pressure increase in such systems always follows the preset pressure ramp without a possibility to vary the time for clutch closing in different situations.

For certain applications, especially in the pleasure craft market, it is preferred to have simple and cheap systems, which allow the driver to apply different clutch closing times spontaneously in different operating situations.

A hydraulic control unit comprising a hydraulic control valve with connections to two clutches of a boat reversing gear is described in DE 3900057 A1. The hydraulic control valve of this unit is a rotary slide valve combination which is switchable by a lever. The hydraulic control valve comprises a rotatable spool, the spool comprising a pressure supply orifice and two clutch actuating orifices. Depending on the rotational position of the spool, pressure will be supplied either to one of the clutches or, in a middle position, to none of the clutches. In the middle or neutral position of the rotary spool, both connections to the clutches are connected to a tank, so that both clutches are disengaged and the propeller shaft is running idle. The hydraulic control unit described in DE 3900057 A1 has a comparable simple structure. However, the mechanical shift by said lever causes a harsh engagement of the clutch, because the clutch is actuated with the nominal hydraulic pressure that is the same pressure which is required to transmit the maximum torque.

An object of the present invention is to provide a hydraulic valve for a clutch actuating system which gives the boat driver a direct control over the engagement procedure of the clutch and enables him to start engaging the clutch at low pressure to obtain a smooth shift. Further objects of the present invention are to provide a clutch actuating system and a boat propulsion system with a simple structure and easy handling, especially in view of a smooth shifting of the clutch. These objects are attained by the present invention.

The present invention provides a hydraulic valve assembly with a housing and with a spool which is rotatable in the housing. The spool can be inserted in a borehole of the housing. The spool comprises a pressure supply orifice and at least one clutch actuating orifice. The clutch actuating orifice is connectable to a clutch actuating cylinder. The spool comprises further a pressure release orifice which is arranged at the spool so that the pressure release orifice is closed by rotational movement of the spool while the clutch actuating orifice is opened by said rotational movement.

The opening of the clutch actuating orifice and the closing of the pressure release orifice happens simultaneously. This means, that the clutch actuating orifice and the pressure release orifice are both partially open at least during a part of the rotational movement. During the time of the rotational movement the pressure on the clutch will gradually increase, because the system pressure is being applied to the clutch actuating cylinder through the opened clutch actuating orifice via the corresponding pressure line. The gradient of the gradual pressure increase is depending on the speed of the rotational movement.

The idea of the present invention is to create a variable and controllable leakage at the spool by the pressure release orifice, this way avoiding a sudden pressure increase at the clutch actuating cylinder which would cause a harsh clutch engagement.

At the beginning of the clutch closing procedure the spool is in neutral position and the pressure release orifice is fully open or at least open to a certain extent, while the clutch actuating orifice is completely closed. At this stage pressure fluid is discharged from the inside of the spool through the pressure release orifice into a pressure release line to a tank or via a lubrication connection line to a lubrication system. Hence the pressure in the spool and on the clutch actuating cylinder is low at the beginning of the clutch closing procedure.

When the rotation of the spool is started, the pressure release orifice starts closing while the clutch actuating orifice starts opening. The clutch actuating orifice and the pressure release orifice are both partially open during a considerable part of the rotational movement. The rotation angle of the spool in which both orifices are partially open is called the spool overlapping angle. A wide overlapping angle provides a high sensitivity of the clutch engagement. At the end of the clutch closing procedure the clutch actuating orifice is preferably fully open and the pressure release orifice is completely closed. The clutch is then fully engaged and may be operated with the maximum torque.

The word orifice means an opening in the outside surface of the spool. Each of the mentioned orifices has got at least one corresponding pressure line, which can be a pressure pipe or duct in the housing. The rotational movement of the spool is a relative movement between the spool and the housing. The housing may be a hydraulic manifold block which contains different hydraulic ducts and components. Each orifice is open, if the orifice of the spool is at least partially aligned with the aperture of its corresponding pressure line in the housing. Each orifice is closed, if it is not aligned with the aperture of its corresponding pressure line in the housing. Each orifice can be partially open, if it is partially aligned with the aperture of its corresponding pressure line in the housing.

Preferably the hydraulic valve assembly is manually controllable, for example by manually controlling the speed of the rotational movement by the driver of the boat. Hence the driver is able to control the time or rate of clutch closing directly. This way the boat driver may vary the time for clutch closing and as a result the acceleration of the boat spontaneously and the boat driver can react directly on different situations. An example where this is particularly advantageous is the starting and acceleration procedure of a water skier linked to the boat by a rope.

According to a preferred embodiment of the invention the rotational movement of the spool is controllable by the driver through a Bowden cable. Therefor a hydraulic valve assembly with a hand lever can be applied, wherein the Bowden cable is connected to the hand lever. This way the driver can modulate the smoothness of the shifting with the speed of his hand movement. A quick movement provides a quick closure of the clutch and a rather harsh engagement, while a slow movement provides a smooth engagement. So the operator is requested to adapt and slow-down the rate of lever movement in order to obtain the desired smoothness of the clutch engagement. On the other hand it is possible to achieve a safe and quick clutch engagement by a quick movement of the lever and spool, if required, for instance in case of an emergency.

Further aspects of the invention concern the above mentioned spool overlapping angle in which the pressure release orifice and the clutch actuating orifice are partially open. This spool overlapping angle when both said orifices are at least partially open can be in a range between 5 and 25 degrees, preferably in a range between 12 and 14 degrees. Generally a wider spool overlapping angle provides higher maneuver sensitivity. Another preferred embodiment provides a pressure limiting piston which is spring-biased inside the spool (see FIG. 3). Such a pressure limiting piston can be moved in the direction of the rotation axis of the spool and is pressed against a spring S by the system pressure which is supplied by a hydraulic pump. As soon as hydraulic fluid pressure inside the spool exceeds a value determined by the strength of said spring S, the pressure limiting piston moves in one direction and opens an outlet to a tank or to a low pressure lubrication system, so that the system pressure is limited to the preset value.

The present invention covers further a boat propulsion system with a clutch activating device as described above. Compared to electronically or hydromechanically controlled systems of prior art, such a system is simpler in structure and handling, and it gives the sensitivity for the pressure increase and clutch closing directly to the driver. This enable the boat driver for example to do trolling maneuvers by maintaining the clutch pressure constant at a level below system pressure and so slip the clutch for as long as he wishes.

Figures 2A, 2B:
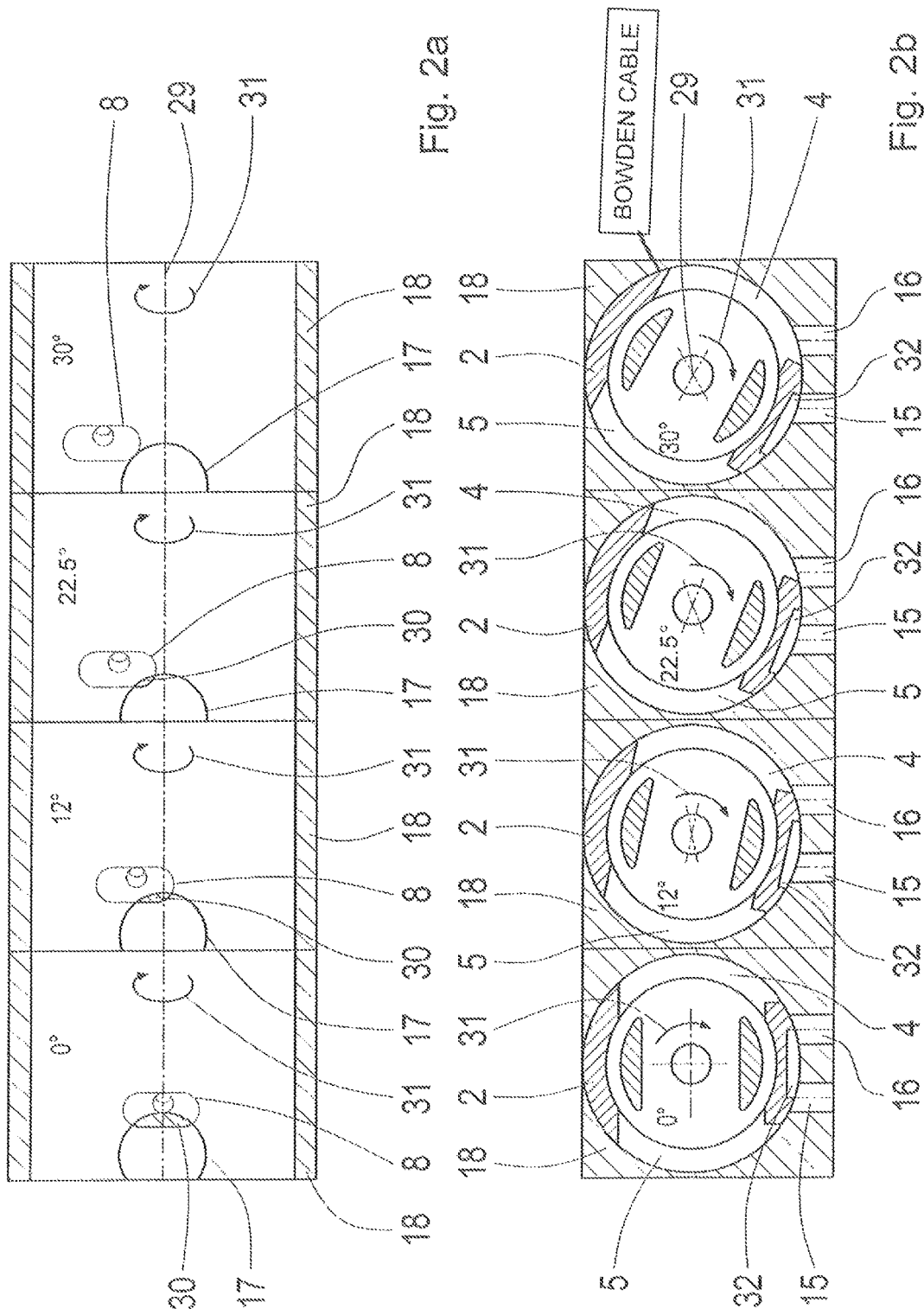
Figure 3:
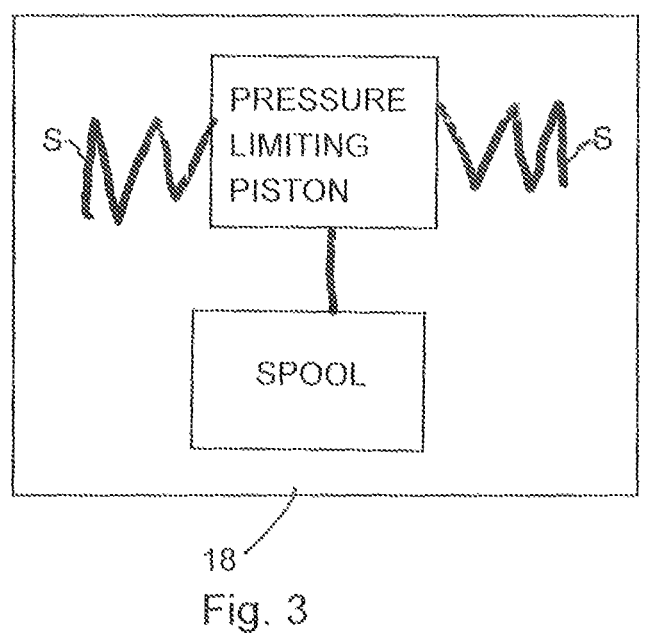

The following detailed description of a preferred embodiment of the invention in connection with the accompanying drawings will help to understand the objects, features and advantages of the invention, wherein:

FIG. 1 shows a schematic hydraulic diagram with a hydraulic valve assembly according to the invention;

FIG. 2a shows a partial section of a hydraulic valve assembly in a top view with the pressure release orifice according to the invention in four different angular positions, FIG. 2b shows a different section of the hydraulic valve assembly in FIG. 2a in a lateral view with the clutch actuating orifice, in the same angular positions of the spool as in FIG. 2a; and FIG. 3 shows a diagrammatic representation of the pressure limiting piston which is spring-biased inside the spool.

The schematic layout of a hydraulic system with a hydraulic valve assembly 1 for the actuation of a clutch can be seen in FIG. 1. The hydraulic system of FIG. 1 is used for example to engage or switch-over a boat reversing gear, not shown in detail, which comprises two clutches 20, 21 for the two possible directions of rotation of a ship's propeller. The specific structure of such a boat reversing gear is not part of the present invention and will therefore not be further described.

A hydraulic pump 10 delivers hydraulic oil or fluid from a tank 11 through a suction line 13 fitted with an initial filter 12 and into a hydraulic pressure system. The two clutch actuating orifices 4 and 5 can be connected either to the system pressure by way of the supply line 14 or to the tank 11 by way of the discharge line 17 using a hydraulic valve assembly 1 which can be switched-over by a lever 9. The hydraulic valve 1 is built in form of a rotary slide valve with a spool 2 which is rotatable relative to a housing 18 of the hydraulic valve assembly 1.

A system pressure relieve valve 19 is arranged after the pump 10 to relieve hydraulic medium to a lubrication line 23 when a set pressure of for example 23 bar is exceeded in the pressure supply line 14. The lubrication line 23 is additionally connected to the pressure supply line 14 over a basic lubricating throttle valve 22 in the bypass line 28.

The lubrication system comprises further a cooler 24 for the lubrication fluid and a lubrication pressure relief valve 25 to limit the lubrication pressure for example to a pressure of about 2 bar. The discharge of the lubrication pressure relief valve 25 opens into a line leading to the tank 11. Lubrication line 23 further guides the fluid subsequent lubrication points 26 and 27 which are located at the multidisc friction clutches 20 and 21.

FIG. 1 shows the hydraulic valve assembly 1 only schematically. The schematic symbol of the valve therefore is the same symbol as used for a non-rotating directional control valve. Nevertheless the basic functions of the hydraulic valve assembly 1 of the present invention can be described with the help of this symbol.

FIG. 1 shows the middle position of the rotatable spool 2 which is also caned the neutral position. In this neutral position both clutch activating orifices 4 and 5 are closed and not connected to the pressure lines 15 or 16. That means none of the two clutch activating orifices 4 and 5 is connected to the corresponding clutch actuating cylinder 6 or 7 in the neutral position. Instead, pressure lines 15 and 16 are connected to the tank 11 via the discharge line 17 and at low pressure, so that none of the two clutches 20 and 21 is closed or engaged and a corresponding propeller shaft is not driven in this state and may run idle.

On rotating the spool 2 into either its indicated left hand or right hand angular end position, either the clutch activating orifices 4 or 5 is opened. The corresponding clutch 20 or 21 will be engaged by its clutch activating cylinder 6 or 7 which is pressurized via pressure line 15 or 16. In the left hand and in the right hand end position one of the two clutch activating orifices 4 and 5 is open and connects the system pressure side to the corresponding clutch activating cylinder 6 or 7, while the other of the two clutch activating orifices 4 and 5 is closed and the corresponding clutch activating cylinder 7 or 6 is depressurized via pressure line 15 or 16. This means that each end position of the hydraulic valve assembly 1 corresponds to one of clutches 20 or 21 in engaged state and the other in disengaged state. However, the present invention might as well be applied in systems with only one clutch and only one corresponding clutch activating orifice at the spool.

FIG. 2a and FIG. 2b show each a row of partial sections of a practical embodiment of the hydraulic valve assembly 1, wherein those components corresponding functionally to the elements of FIG. 1 carry the same reference numerals as in FIG. 1. Basically FIG. 2a and FIG. 2b show the rotatable spool 2 in different angular positions inside the stationary housing 18. For clarity reasons the spool 2 and housing 18 are drawn in a simplified form. The spool 2 is rotatable around its rotation axis 29. The rotational movement of the spool 2 related to the housing 18 is indicated by rotation arrows 31.

FIG. 2a and FIG. 2b together illustrate the simultaneous opening of the clutch actuating orifice 4, 5 and the closing of the pressure release orifice 8 by showing each four successive angular positions of the spool 2 during the rotational movement 31 of the spool 2. The rotational movement 31 is illustrated in one direction starting from the middle neutral position, so to close clutch 21 by opening the clutch actuating orifice 4. Closing of the other clutch 20 may be effected by a corresponding rotational movement of the spool 2 in the opposite direction.

The neutral position shown on the very left side of FIG. 2a and FIG. 2b corresponds to the angular position of the spool of 0 degree and to the position shown in FIG. 1. Successively from left to right side in FIG. 2a and FIG. 2b three further sections show the valve assembly 1, wherein the spool 2 has been rotated by 12, 22.5 and 30 angular degree in one direction.

Each partial section of FIG. 2a shows the pressure release orifice 8 in a dashed line and the aperture of the corresponding discharge line 17 as a solid line. Each partial section of FIG. 2b shows the clutch activating orifices 4 and 5 and the corresponding pressure lines 15 and 16 in the housing 18.

Rotation Angle 0 Degree:

A considerable part of the pressure release orifice 8 is open to the aperture of the discharge line 17 providing a passage 30 to relieve hydraulic fluid to the tank 11, at a rotation angle of 0 degree between the spool 2 and the housing 18, as can be seen in FIG. 2a. Hence the pressure inside the spool 2 is very low about the same pressure level as tank 11.

Both clutch activating orifices 4 and 5 are closed at a rotation angle of 0 degree, as can be seen in FIG. 2b. In this rotational position of the spool 2 both pressure lines 15 and 16 are connected to the tank 11 via pressure release slot 32 in the spool 2. Hence there is no pressure or a very low pressure in pressure lines 15, 16 and in the clutch activating cylinders 6 and 7. The clutches 20 and 21 are disengaged, i.e. open.

Rotation Angle 12 Degree:

There is still a considerable part of the pressure release orifice 8 open to the aperture of the discharge line 17 providing a passage 30 to relieve hydraulic fluid to the tank, at a rotation angle of 12 degree, as can be seen in FIG. 2a.

Clutch activating orifice 4 is just about to start opening to pressure line 16 at a rotation angle of 12 degree, as can be seen in FIG. 2b. Pressure line 16 is disconnected from pressure release slot 32 and from tank 11. Hence in pressure line 16 and in the corresponding clutch activating cylinder 7 pressure built-up starts at this rotational position of spool 2. However, this pressure built-up starts at a low pressure level, because the pressure release orifice 8 is still open to a considerable part, what keeps the pressure inside the spool on a relatively low level. The clutch 21 is still disengaged. Clutch activating orifice 5 is closed at a rotation angle of 12 degree, as can be seen in FIG. 2b. In this rotational position of the spool 2 pressure line 15 is connected to the tank 11 via pressure release slot 32 in the spool 2. Hence there is no pressure or a very low pressure in pressure line 15 and in the corresponding clutch activating cylinder 6. The clutch 20 stays disengaged.

Rotation Angle 22.5 Degree:

There is only a minimum part of the pressure release orifice 8 open to the aperture of the discharge line 17 providing a very little passage 30 to relieve hydraulic fluid to the tank, at a rotation angle of 22.5 degree, as can be seen in FIG. 2a.

Clutch activating orifice 4 is open to pressure line 16 at a rotation angle of 22.5 degree to a considerable amount. Pressure line 16 is disconnected from pressure release slot 32 and from tank 11. Hence in pressure line 16 the pressure continues to increase at this rotational position of spool 2 and the pressure has started to increase gradually in pressure line 16 and in the corresponding clutch activating cylinder 7. The clutch 21 has started to be closed at this stage. The gradient of the pressure increase and subsequently the time for the clutch closing procedure is depending on the speed of the rotational movement. The driver of the boat may control this way the smoothness of clutch closing.

Clutch activating orifice 5 remains closed, as can be seen in FIG. 2b. Pressure line 15 is connected to the tank 11 via pressure release slot 32 in the spool 2. Hence there is no pressure or a very low pressure in pressure line 15 and in the corresponding clutch activating cylinder 6. The clutch 20 stays disengaged.

Rotation Angle 30 Degree:

The pressure release orifice 8 is completely closed, so that there is no passage 30 from inside the spool to the discharge line 17, at a rotation angle of 30 degree, as can be seen in FIG. 2a. So there is no pressure fluid flow through pressure release orifice 8 possible at this stage.

Clutch activating orifice 4 is fully open to pressure line 16 at a rotation angle of 30 degree. Pressure line 16 is disconnected from pressure release slot 32 and from tank 11. Hence the pressure has already reached system pressure in pressure line 16 and in the corresponding clutch activating cylinder 7 or system pressure will quickly be reached. The clutch 21 is already closed or will be quickly closed at this stage. Clutch activating orifice 5 remains closed, as can be seen in FIG. 2b. Pressure line 15 is connected to the tank 11 via pressure release slot 32 in the spool 2. Hence there is no pressure or a very low pressure in pressure line 15 and in the corresponding clutch activating cylinder 6. The clutch 20 stays disengaged.

REFERENCE NUMERAL 1 hydraulic valve assembly
2 spool
3 pressure supply orifice
4 clutch actuating orifice
5 clutch actuating orifice
6 clutch actuating cylinder
7 clutch actuating cylinder
8 pressure release orifice
9 hand lever
10 pump
11 tank
12 filter
13 suction line
14 supply line
15 pressure line
16 pressure line
17 discharge line
18 housing
19 system pressure relief valve
20 clutch
21 clutch 22 basic lubricating throttle valve
23 lubrication line
24 cooler
25 lubrication pressure relief valve
26 lubrication point
27 lubrication point
28 bypass line
29 rotation axis
30 passage
31 rotation arrow
32 pressure release slot
33 lubrication connection line

The invention claimed is:

1. A hydraulic valve assembly (1) with a housing (18) comprising a spool (2) which is rotatable within the housing (18), the spool comprising:
   a pressure supply orifice (3), and
   at least one clutch actuating orifice (4, 5) being connectable to a clutch actuating cylinder (6, 7),
   wherein the spool comprises a pressure release orifice (8) which is arranged with the spool (2) so that the pressure release orifice (8) is closed by rotational movement of the spool (2) while the clutch actuating orifice (4, 5) is opened by the rotational movement; and
   a spool overlapping angle, in which the pressure release orifice (8) and the clutch actuating orifice (4, 5) are partially open, is in a range of between 5 and 25 degrees.

2. The hydraulic valve assembly according to claim 1, wherein the hydraulic valve assembly (1) is manually controllable.

3. The hydraulic valve assembly according to claim 2, wherein the rotational movement of the spool (2) is controllable by a driver via a Bowden cable connected to the spool (2).

4. The hydraulic valve assembly according to claim 1, wherein the spool overlapping angle is in a range of between 12 and 14 degrees.

5. The hydraulic valve assembly according to claim 1, wherein the spool (2) comprises a pressure limiting piston which is spring-biased inside the spool (2).

6. A clutch actuating device with a clutch actuating cylinder (6, 7) and a hydraulic valve assembly (1) with a housing (18) comprising a spool (2) which is rotatable within the housing (18), the spool comprising:
   a pressure supply orifice (3), and
   at least one clutch actuating orifice (4, 5) being connectable to a clutch actuating cylinder (6, 7),
   wherein the spool comprises a pressure release orifice (8) which is arranged with the spool (2) so that the pressure release orifice (8) is closed by rotational movement of the spool (2) while the clutch actuating orifice (4, 5) is opened by the rotational movement; and
   a spool overlapping angle, in which the pressure release orifice (8) and the clutch actuating orifice (4, 5) are partially open, is in a range of between 5 and 25 degrees;
   wherein the clutch actuating orifice (4, 5) of the spool (2) is connectable to the clutch actuating hydraulic cylinder (6, 7) via a pressure line (15, 16).

7. A marine propulsion system having a clutch actuating device according to claim 6.

* * * * *